US009652936B2

(12) United States Patent
Elias et al.

(10) Patent No.: US 9,652,936 B2

(45) Date of Patent: May 16, 2017

(54) METHODS AND SYSTEMS FOR REWARDING FRIENDS OF A PLAYER BASED ON BONUS QUALIFYING CONDITION TRIGGERED BY PLAYER

(71) Applicant: Gamesys Ltd, London (GB)

(72) Inventors: Hans Elias, St. Albans (GB); Robeson Mandela Reeves, London (GB); Thomas David James Aicken, London (GB)

(73) Assignee: Gamesys, Ltd., London (GB)

( * ) Notice: Subject to any disclaimer, the term of this patent is extended or adjusted under 35 U.S.C. 154(b) by 161 days.

(21) Appl. No.: 14/010,888

(22) Filed: Aug. 27, 2013

(65) Prior Publication Data

US 2014/0057705 A1 Feb. 27, 2014

Related U.S. Application Data

(60) Provisional application No. 61/693,762, filed on Aug. 27, 2012.

(51) Int. Cl.
*G06F 17/00* (2006.01)
*G07F 17/32* (2006.01)

(52) U.S. Cl.
CPC ...... *G07F 17/3267* (2013.01); *G07F 17/3244* (2013.01); *G07F 17/3274* (2013.01)

(58) Field of Classification Search
CPC ............. G07F 17/3267; G07F 17/3274; G07F 17/3244
See application file for complete search history.

(56) References Cited

U.S. PATENT DOCUMENTS 6,142,872 A 11/2000 Walker et al.
6,203,430 B1 3/2001 Walker et al.
6,206,782 B1 3/2001 Walker et al.
6,244,958 B1 * 6/2001 Acres ............................. 463/26
6,312,332 B1 11/2001 Walker et al.
6,319,122 B1 11/2001 Packes et al.
6,328,648 B1 12/2001 Walker et al.
6,361,441 B1 3/2002 Walker et al.
6,364,765 B1 4/2002 Walker et al.
6,503,146 B2 1/2003 Walker et al.
6,648,762 B2 11/2003 Walker et al.
6,692,353 B2 2/2004 Walker et al.
6,712,699 B2 3/2004 Walker et al.
(Continued)

*Primary Examiner* — Dmitry Suhol
*Assistant Examiner* — Carl V Larsen
(74) *Attorney, Agent, or Firm* — Fincham Downs, LLC; Magdalena M. Fincham

(57) ABSTRACT

In accordance with some embodiments, provided herein are systems, methods and articles of manufacture for providing bonuses to player of games (e.g., online wagering games) based on the achievement of a qualifying event by another player (e.g., a friend of the players who are provided the bonuses). In accordance with some embodiments, such bonuses are funded out of respective bonus funding accounts maintained and managed for the players (which may be game-specific). In accordance with some embodiments, such bonus funding accounts may be maintained for players without the player's knowledge or control and may be funded based on gaming activity of the players (e.g., a portion of each wager made by a player may be contributed to the balance of the player's bonus funding account).

22 Claims, 7 Drawing Sheets

(56) References Cited

U.S. PATENT DOCUMENTS

| | | | | |
|---|---|---|---|---|
| 6,733,390 | B2 | 5/2004 | Walker et al. | |
| 6,843,724 | B2 | 1/2005 | Walker et al. | |
| 7,040,987 | B2 | 5/2006 | Walker et al. | |
| 7,364,510 | B2 | 4/2008 | Walker et al. | |
| 7,387,571 | B2 | 6/2008 | Walker et al. | |
| 7,416,485 | B2 * | 8/2008 | Walker et al. | 463/25 |
| 7,637,811 | B2 | 12/2009 | Walker et al. | |
| 7,785,194 | B2 * | 8/2010 | Schneider et al. | 463/25 |
| 8,096,873 | B2 * | 1/2012 | Walker et al. | 463/25 |
| 8,240,670 | B2 | 8/2012 | Vancura et al. | |
| 8,246,468 | B2 | 8/2012 | Anderson et al. | |
| 8,287,343 | B2 | 10/2012 | Reynolds et al. | |
| 8,337,311 | B2 | 12/2012 | Amos et al. | |
| 8,480,467 | B2 | 7/2013 | Walker et al. | |
| 2002/0193162 | A1 * | 12/2002 | Walker et al. | 463/42 |
| 2003/0199312 | A1 * | 10/2003 | Walker et al. | 463/25 |
| 2004/0176157 | A1 | 9/2004 | Walker et al. | |
| 2004/0248642 | A1 * | 12/2004 | Rothschild | G07F 17/32 463/20 |
| 2005/0049042 | A1 | 3/2005 | Walker et al. | |
| 2006/0178189 | A1 | 8/2006 | Walker et al. | |
| 2006/0211480 | A1 | 9/2006 | Walker et al. | |
| 2007/0010321 | A1 | 1/2007 | Walker et al. | |
| 2007/0010322 | A1 | 1/2007 | Walker et al. | |
| 2007/0015571 | A1 | 1/2007 | Walker et al. | |
| 2007/0077985 | A1 | 4/2007 | Walker et al. | |
| 2007/0093288 | A1 | 4/2007 | Walker et al. | |
| 2007/0129141 | A1 | 6/2007 | Walker et al. | |
| 2007/0129149 | A1 | 6/2007 | Walker et al. | |
| 2007/0167223 | A1 * | 7/2007 | Bleich et al. | 463/25 |
| 2008/0113770 | A1 * | 5/2008 | Gelber | G07F 17/32 463/25 |
| 2008/0318655 | A1 * | 12/2008 | Davies | 463/16 |
| 2009/0011822 | A1 | 1/2009 | Englman et al. | |
| 2009/0111561 | A1 * | 4/2009 | Dewaal et al. | 463/20 |
| 2009/0124327 | A1 | 5/2009 | Caputo et al. | |
| 2010/0004056 | A1 | 1/2010 | Walker et al. | |
| 2010/0124988 | A1 * | 5/2010 | Amos et al. | 463/27 |
| 2010/0331076 | A1 | 12/2010 | Dickerson | |
| 2012/0136465 | A1 * | 5/2012 | Guinn et al. | 700/92 |
| 2012/0302326 | A1 | 11/2012 | Anderson et al. | |
| 2013/0130782 | A1 * | 5/2013 | Hornik et al. | 463/25 |
| 2014/0024430 | A1 * | 1/2014 | Wisler et al. | 463/20 |
| 2014/0080587 | A1 | 3/2014 | Walker et al. | |

* cited by examiner

500

| NUMBER OF SPINS 502 | R LOWER BOUND 504 | R UPPER BOUND 506 | NOTHING 508 | INSTANT CASH WIN 510 | PICK BONUS 512 | FREE SPINS 514 |
|---|---|---|---|---|---|---|
| 0 | 0 | 2 | 100% | 0% | 0% | 0% |
| 7 | 2 | 4 | 0% | 100% | 0% | 0% |
| 13 | 4 | 6 | 0% | 100% | 0% | 0% |
| 20 | 6 | 8 | 0% | 50% | 50% | 0% |
| 27 | 8 | 10 | 0% | 45% | 45% | 10% |
| 33 | 10 | 12 | 0% | 40% | 40% | 20% |
| 40 | 12 | 14 | 0% | 35% | 35% | 30% |
| 47 | 14 | 16 | 0% | 30% | 30% | 40% |
| 53 | 16 | 18 | 0% | 25% | 25% | 50% |
| 60 | 18 | 20 | 0% | 20% | 20% | 60% |
| 67 | 20 | 22 | 0% | 15% | 15% | 70% |
| 73 | 22 | 24 | 0% | 10% | 10% | 80% |
| 80 | 24+ | — | 0% | 0% | 100% | 0% |

FIG. 5

METHODS AND SYSTEMS FOR REWARDING FRIENDS OF A PLAYER BASED ON BONUS QUALIFYING CONDITION TRIGGERED BY PLAYER

CLAIM OF PRIORITY

The present application claims the benefit of priority of U.S. Provisional Patent Application Ser. No. 61/693,762, filed Aug. 27, 2012 in the name of Elias et al. and entitled METHODS AND SYSTEMS FOR REWARDING FRIENDS OF A PLAYER BASED ON BONUS QUALIFYING CONDITION TRIGGERED BY PLAYER. The entirety of this application is incorporated by reference herein for all purposes.

FIELD OF THE INVENTION

At least some embodiments described herein relate to electronic games (e.g., such as online wagering games) which allow a player to accumulate value in an account that may be "hidden" from the player and from which rewards or prizes are funded for the player (e.g., the funding or provision of such rewards or prizes being triggered by activity of another player associated with the player of the account).

BRIEF DESCRIPTION OF THE FIGURES

FIG. 5 is an example table of a game model database consistent with at least some embodiments described herein.

DETAILED DESCRIPTION OF THE FIGURES AND EXAMPLE EMBODIMENTS

Figure 1:
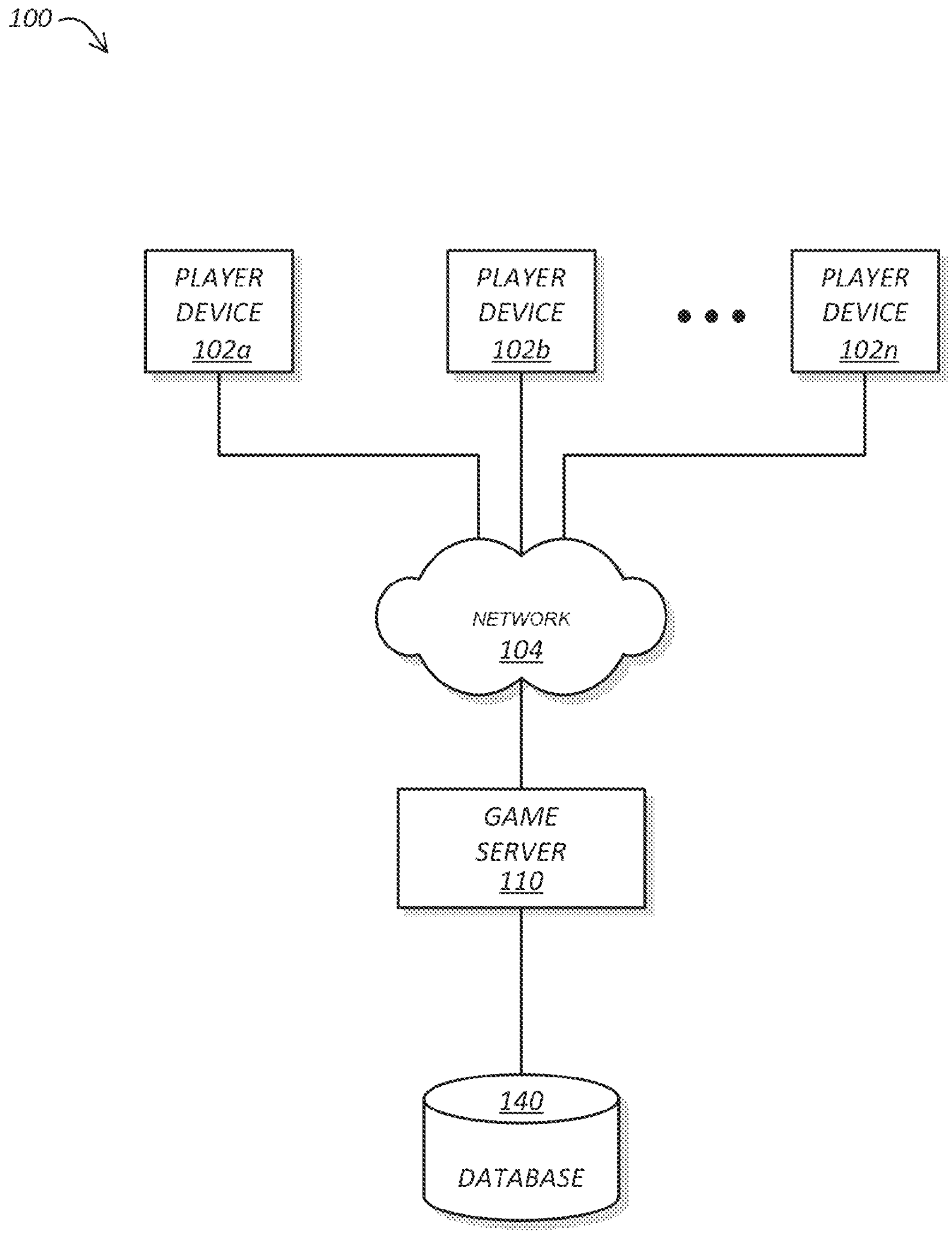
FIG. 1 is a schematic diagram of an embodiment of a gaming system in accordance with one or more embodiments described herein.

Games, whether wagering or non-wagering, are a popular past-time for millions of people all over the world. Electronic games in particular are becoming more and more popular, particularly ones playable online using a computer connected to a network. For example, according to some reports more than 200 million people play social network (e.g., ones supported by Facebook™) games every month and online games recently passed e-mail as the second-most popular activity online, second only behind social networking. Accordingly, there is a need to continue to create exciting electronic games which maintain players' interest and stand out from the multitude of available online games.

Applicants have recognized that players of games (e.g., online wagering games) typically have a network of friends that they would enjoy sharing positive events with, such as by having the friends in their social network rewarded with bonuses upon the players achieving a qualifying event (e.g., when they themselves qualify for an award or bonus during game play). Applicants have further recognized that the friends of the player who are so rewarded (e.g., by having bonuses awarded to them even when they are not actively playing) may be more likely to visit, register with or return to the establishment administering the game(s) via which the player qualified for the award or bonus, to either collect the bonus or utilize it for playing games available at the establishment. Applicants have still further recognized that such bonuses to the player's friends may be funded out of the game play of the friends themselves, resulting in little or no additional cost to the establishment. Thus, in one or more embodiments, the value of a bonus awarded to a friend of the player upon the player achieving a qualifying event (e.g., upon the player qualifying for an award or bonus) may be limited to the value accrued in an account established for that friend (e.g., the value based on that friend's prior game play) or on a parameter based on the value of the friend's bonus funding account. For example, in some embodiments the value of a bonus may be limited to an amount no more than twice the balance of the bonus funding account and any value in excess of the friend's bonus funding account balance may be provided for in an alternate manner (e.g., in some embodiments the friend may be awarded a larger bonus award and the value of the award may be repaid to the gaming establishment by garnishing a portion of the friend's wagers going forward while in other embodiments the larger bonus award may be funded out of a marketing budget of the gaming establishment).

As used herein, the term "friend" as in a friend of a player, refers (unless indicated otherwise) to another player associated with the subject player (e.g., in a database). In some embodiments, the one or more friends of a player are associated with the player based on a request to be so associated (e.g., a request by the player and/or a verification or permission for the association from the friends). In other embodiments, the association may be made or inferred and stored by a computing system based on interactions (e.g., online interactions such as positing on social network sites and/or chats among players) between the player and the one or more friends. In accordance with some embodiments, such association may cause a reward to be provided or considered (or a process for determining whether a reward should be provided) to the other players or friends associated with a subject player when the subject player achieves a qualifying event during game play of a qualifying game (i.e., a game the play of which satisfies a condition for rewards to be funded from a bonus funding account).

In accordance with one or more embodiments, a player may be associated with one or more other players in a database (e.g., a database of an online casino or other gaming establishment). The other players associated with a particular player are referred to herein as the friends in the player's network or simply as friends of the player (of course, the associated players may not necessarily be friends as the player may think of them, they may be acquaintances, business associates, family members or simply other players the system has associated with the player). A player may be a person who participates in one or more games available on an online casino or other gaming establishment. A gaming establishment may comprise, for example, a website which provides games available for play, whether providing games is the primary purpose of the establishment or otherwise, the games being either wagering games or other electronic games.

A respective "bonus funding account" may be established for a given player (and, in some embodiments, for each of the friends in the player's network). In accordance with one embodiment, value may be accrued in a given player's bonus funding account based on game play of the given player. In accordance with some embodiments, a bonus may be distributed to a given player, funded out of the player's bonus funding account, upon a qualifying condition occurring during game play of a friend in the player's network. It should be noted that the term "bonus" as used herein refers to any award, reward, advantage or prize (whether monetary or non-monetary). A bonus may, in accordance with some embodiments, be funded by value or monies in a bonus funding account. A provision, awarding or distribution of a bonus may, in accordance with some embodiments, be triggered as a result of a qualifying event in a primary game or a secondary or bonus game of a player associated with the player to whom the bonus is to be provided, awarded or distributed. In accordance with embodiments described herein, a bonus is awarded to a player when it is made available for use to the player, the player is notified of the awarding of the bonus and/or the bonus is distributed to the player (e.g., value comprising the bonus is transferred from the player's bonus funding account to another financial account or other mechanism via which the player may enjoy the benefits, advantages or features of the bonus). In accordance with some embodiments, a bonus funding account is maintained, updated and managed for a player by a gaming establishment or other game provider without the knowledge of the player, such that the player does not have control of the bonus funding account, cannot request disbursements or debits from the funding account and cannot select when a bonus is funded from the bonus funding account. That is, in accordance with some embodiments, a bonus funding account comprises an account managed by a gaming establishment or other game provider as a mechanism for providing and funding bonuses to the player, at the sole discretion of the gaming establishment or game provider and not at the discretion of the player. In accordance with some embodiments, the player for whom a bonus funding account is established and managed may not be provided with any indication (or means of finding out) the existence of the bonus funding account, a current balance of the bonus funding account or even that a particular bonus provided to the player was funded by the bonus funding account. For example, bonuses may be provided to the player as "gifts" or "wins" without the player being informed that the bonuses are funded out of a bonus funding account which has been accumulating value based on game play by the player. In some embodiments, bonuses funded out of a bonus funding account may be provided to a player in a manner which makes them indistinguishable, from the player's perspective, from bonuses which are provided to the player but which are not funded out of the bonus funding account (e.g., bonuses which are won by the player in a regular course of game play based on a paytable of the game).

In accordance with some embodiments, a balance of a bonus funding account being maintained for a player is increased based on gaming-related activity of the player. For example, in one embodiment a portion or percentage of each qualifying wager made by the player (e.g., a portion or percentage of each wager made by the player in a qualifying game, such as a primary game which supports bonuses funded by the bonus funding account) is added to the bonus funding account. In another example, a predetermined amount or value is added to the balance of the bonus funding account for each qualifying activity performed by the player (e.g., a first predetermined amount is added each time the player logs into the qualifying game via a website of the gaming establishment, a second predetermined amount is added for each consecutive half-hour of game play of the qualifying game by the player and a third predetermined amount is added for each predetermined period of time the player maintains a minimum average wager amount). In other embodiments, value to a bonus funding account of a player may be added from a marketing budget of a gaming establishment, game or particular game (e.g., in addition to or in lieu of the bonus funding account being funded by gaming-related activity of the player such as percentages of wagers made by the player).

In accordance with some embodiments, the balance of a bonus funding account being maintained for a player is decreased when a bonus is funded out of the bonus funding account and provided or awarded to the player (e.g., as may occur upon another player who is associated with the player of the bonus funding account achieving a qualifying event). When a bonus is funded for a player out of the player's bonus funding account, the value or balance of the bonus funding account is modified to reflect the bonus (e.g., the balance is decreased by the value of the bonus or another value related to the value of the bonus). In accordance with some embodiments, once a bonus is provided to a player out of the player's bonus funding account, the player is ineligible to receive another bonus from the player's bonus funding account until a predetermined condition is satisfied (e.g., until a predetermined period of time from the time the bonus was provided to the player has passed).

In some embodiments (as described in detail elsewhere herein) one or more additional conditions (additional to another associated player achieving a qualifying event) may need to be satisfied prior to a bonus being funded out of a player's bonus funding account. For example, the value of the bonus funding account may need to be at least a predetermined value, the player must have played the qualifying game (or participated in some other qualifying activity) within a predetermined period of time from the qualifying event, a predetermined period of time since the last bonus funded out of the player's bonus funding account was provided to the player has passed and/or the player needs to have maintained at least a minimum average wager in order to qualify for the bonus.

In accordance with some embodiments, a bonus funding account is specific to a particular game. For example, the mathematical model of a game may be adjusted (e.g., the rate of return to the player ("RTP" herein) for a game which supports a bonus funding account) may be adjusted to account for the value being accumulated for a player in a bonus funding account.

Examples of a qualifying event include, without limitation, the player qualifying for a bonus round, award or bonus during play of a primary or bonus game, the player achieving a certain level, accomplishment or number of points or score in a game, the player initiating a game, or the player funding a wagering or other account. In some embodiments, the player who is to be provided awarded a bonus (or is awarded a bonus) as a result of another's player achieving a qualifying event may be referred to as a "qualifying friend" of the player who achieved the qualifying event that triggered the awarding of the bonus. In some embodiments, in order for a player to be awarded a bonus as a result of a qualifying event being achieved by another associated player, the player who is to be awarded the bonus must further qualify for the bonus by satisfying one or more additional conditions. For example, in some embodiments a qualifying friend in a given player's network may only qualify to be awarded a bonus upon the occurrence of a qualifying event of the player if the qualifying friend's bonus funding account has a value at or above a predetermined minimum amount. In some embodiment, a qualifying friend may qualify if he or she has any value above zero in their associated bonus funding account. It should be noted that the "value" in a bonus funding account may be monetary or non-monetary and that the bonuses provided to players may be monetary or non-monetary. For example, while in some embodiments a bonus funding account may hold some monetary value that is awarded to the player associated with the account as a bonus, in other embodiments a bonus funding account may hold a non-monetary value such as points, skills or attributes that are awarded to the associated person (or a game or character in a game of the associated person) when a bonus is awarded from the account.

In accordance with some embodiments, a value, type or other characteristic of a bonus to be provided to a player (which bonus is funded out of the player's bonus funding account) may be determined based on a balance of the player's bonus funding account at the time it is determined that the player is to receive the bonus based on a qualifying event being achieved by another player. For example, a value of the bonus may be based on the balance of the bonus funding account (e.g., such that the balance of the bonus funding account is the maximum value of the bonus that may be provided to the player). In another example, the type of bonus to be provided to the player may be based on the most recent (or another) type of bonus provided to the player out of the player's bonus funding account. In other embodiments, information other than (or in addition to) the balance of the player's bonus funding account may be utilized in determining the value, type or other characteristic of a bonus to be provided to the player out of the player's bonus funding account. For example, a current average wager amount associated with the player may be at least one factor which is used to determine a value of the bonus to be provided to the player. It should be noted that where a bonus is referred to herein as being provided "out of" a bonus funding account it is intended to convey that a value of the bonus is at least partially funded with the value of the bonus funding account such that the balance of the bonus funding account is decreased as a result of the bonus being provided to the player (e.g., at least a portion of the value of the bonus is debited from the value of the player's bonus funding account).

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a personal computer online in web browsers, on a game console and/or on a mobile device such as a smart-phone or tablet computer. "Gaming" thus refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" refers to play of a wagering game.

The term "game provider", as used herein unless specified otherwise, refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

A "session" comprises a period of time spanning a plurality of event instances, game instances or turns of the game, the session having a defined start and defined end. An "event instance", "game instance" or "turn" is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance). An event instance or turn may comprise an event instance or turn of a primary game or an event instance or turn of a bonus round, mode or feature of the game. Accordingly, a session may refer to a session of a primary game or a session of a bonus round, mode or feature of the game, depending on the context.

An "outcome" should be differentiated from a "result" in the present description in that an "outcome" is a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass prizes which may comprise awards, payouts, discounts, eligibility, advancement in a game or other benefits (whether monetary or non-monetary, tangible or intangible) to a player.

A "bonus round", "bonus mode" or "bonus feature" of a game, as the terms are used interchangeably herein unless indicated otherwise, may refer to a secondary game, entry into which is triggered via one or more events which may occur in a base or primary game. Typically, a player may be able to qualify to play a bonus game based on one or more outcomes in a primary game, such as in a basic mode or a qualifying mode. A bonus round may be played in accordance with a set of rules that is different from those of a primary game, and may be accompanied by displays, colors, sounds, animated sequences, game play and/or prizes that are not part of the primary game. In one embodiment, a primary or base game application or program may include programming or instructions which will automatically begin a bonus round after the player has achieved a triggering event or qualifying condition in the base or primary game.

"Virtual currency" as the term is used herein unless indicated otherwise, refers to an in-game currency that may be used as part of a game or one or more games provided by a game provider as (i) currency for making wagers, and/or (ii) to purchase or access various in-game items, features or powers.

A "credit balance", as the term is used herein unless indicated otherwise, refers to (i) a balance of currency, whether virtual currency or real currency, usable for making wagers in the game and/or (ii) another tracking mechanism for tracking a player's success or advancement in a game by deducting therefrom points or value for unsuccessful attempts at advancement and adding thereto points or value for successful attempts at advancement.

Turning now to the Figures, FIG. 1 depicts a block diagram of an example system 100 according to some embodiments. The system 100 may comprise a plurality of player devices 102*a*-102*n* in communication with a game server 110 via a network 104. For purposes of brevity, any or all of the player devices 102*a*-102*n* will be referred to as a player device 102 herein, even though the plurality of player devices 102*a*-102*n* may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140 (e.g., another server device remote from game server 140, operable to determine a game model to utilize and/or whether a friend of a player qualifies to have a bonus awarded from the player's bonus funding account based on a qualifying event achieved by the player). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts.

In some embodiments a game server 110 and/or one or more of the player devices 102 stores and/or has access to data useful for facilitating play of a game. For example, game server 110 and/or a player device 102 may store (i) one or more probability databases for determining one or more outcome(s) for an event instance or turn of a game, (ii) a current state or status of a game or game session, (iii) one or more user interfaces for use in a game, (iv) one or more game models for a game, (v) whether a player has achieved a qualifying event for awarding a bonus to a friend of a player, (vi) data associated with a player which may be useful, in accordance with some embodiments, whether a player qualifies for an award from the player's bonus funding account and/or a game model to use in providing the award to the player (e.g., an average wager amount of the player or other play history data of the player); (vii) whether the friend of the player has a sufficient balance in his/her bonus funding account to be awarded a bonus based on the qualifying event, and/or (vii) profiles, preferences, ratings or other information associated with a player of a game (e.g., friends associated with the player who may qualify for a bonus based on the player achieving a qualifying event during game play). It should be noted that in some embodiments any or all of the data described above may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player, determining an outcome for a game, causing an outcome of a game to be displayed on a player device, facilitating a wager and/or a provision of a payout for a game). For example, the game server 110 may comprise a server computer operated by a game provider or another entity (e.g., a social network website not primarily directed at providing games). In some embodiments, the game server may determine an outcome for a first aspect and/or second aspect of a game by requesting and receiving such an outcome from another remote server operable to provide such outcomes. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, updating a balance of a bonus funding account based on game play of a player, managing other accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator). Examples of processes that may be performed by the game server 110 (directly or indirectly) may include, but are not limited to: (i) determining whether a player has achieved a qualifying event during play of a game; (ii) determining one or more friends in the player's network who may qualify to receive a bonus funded out of their respective bonus funding accounts based on the player achieving the qualifying event; (iii) determining, based on data stored in association with the one or more friends, whether a respective friend of the player qualifies for an award from the friend's bonus funding account; (iv) updating the player's bonus funding account based on game play of the player and/or bonuses awarded to the player out of the bonus funding account; (v) storing an indication of a bonus due to a player as a result of another player achieving a qualifying event; (vi) determining a game model to utilize for a game or award based on a balance of a bonus funding account of a player, a bonus awarded to the player as a result of a qualifying event achieved by another player and/or another factor; (vii) updating a record in a database or table associated with a player to indicate that the player has redeemed or been provided with an award due to the player; (viii) authorizing a game program to be downloaded to a player device; and/or (ix) outputting (or directing another device to output, or queuing for output) a notification to a player that the player has been awarded a bonus (e.g., funded out of a bonus funding account, the existence or funding source of which the player maybe unaware in accordance with some embodiments) as a result of another player achieving a qualifying event.

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ PlayStation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., outcomes for an event instance of the game, qualifying for an award as a result of a qualifying condition being achieved by the player or another player, credit balance of credits available for play of the game, a session result for a session of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that an event instance has been triggered or initiated (and, in some embodiments, communicating such a trigger or initiation to game server 110), (ii) that a qualifying event has been achieved by the player (e.g., based on a result of the game instance); (iii) identifying at least one other player to whom a bonus should be awarded (the bonus being funded out of the respective other player's bonus funding account) as a result of the player achieving a qualifying event, and/or (iv) determining a bonus (e.g., a value or range of a bonus) or game model to utilize for a player (e.g., based on the balance of the bonus funding account, game play activity of the player to whom the bonus or game model is to be output and/or game play activity of the player who achieved the qualifying event). In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102.

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
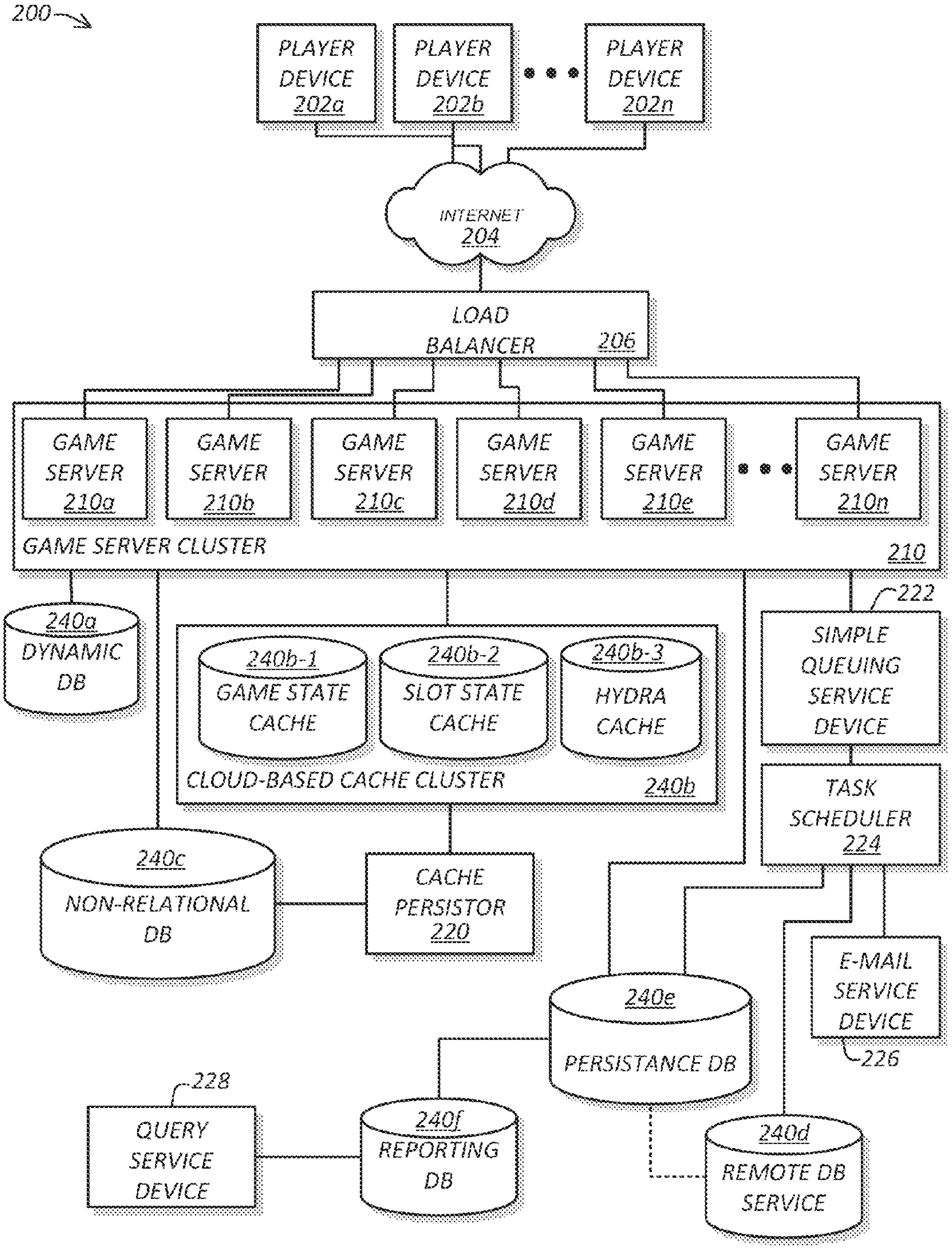
FIG. 2 is a schematic diagram of an embodiment of a social gaming platform in accordance with one or more embodiments described herein.

FIG. 2 a block diagram of a system 200 according to some embodiments is shown. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances of available game types. A first game server 210*a*, for example, may host a first particular instance of an online bingo game (or tournament), a second game server 210*c* may host a second particular instance of an online bingo game (or tournament), a third game server 210*c* may facilitate an online poker tournament, and/or a fourth game server 210*d* may provide an online slots game.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., a reeled slots themed game) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache **240*b*-1, for example, slot state (e.g., slot-game specific state) data may be stored in the slot state cache 240*b*-2, and/or other game and/or player information (e.g., progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c***.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service **240*d* (e.g., providing inserts and/or updates), and/or the persistence DB 240*e*** (e.g., providing and/or updating game, player, and/or other reporting data), e.g., in accordance with one or more schedules.

According to some embodiments, the persistence DB **240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e***.

In some embodiments, the reporting DB **240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210**.

Figure 3:
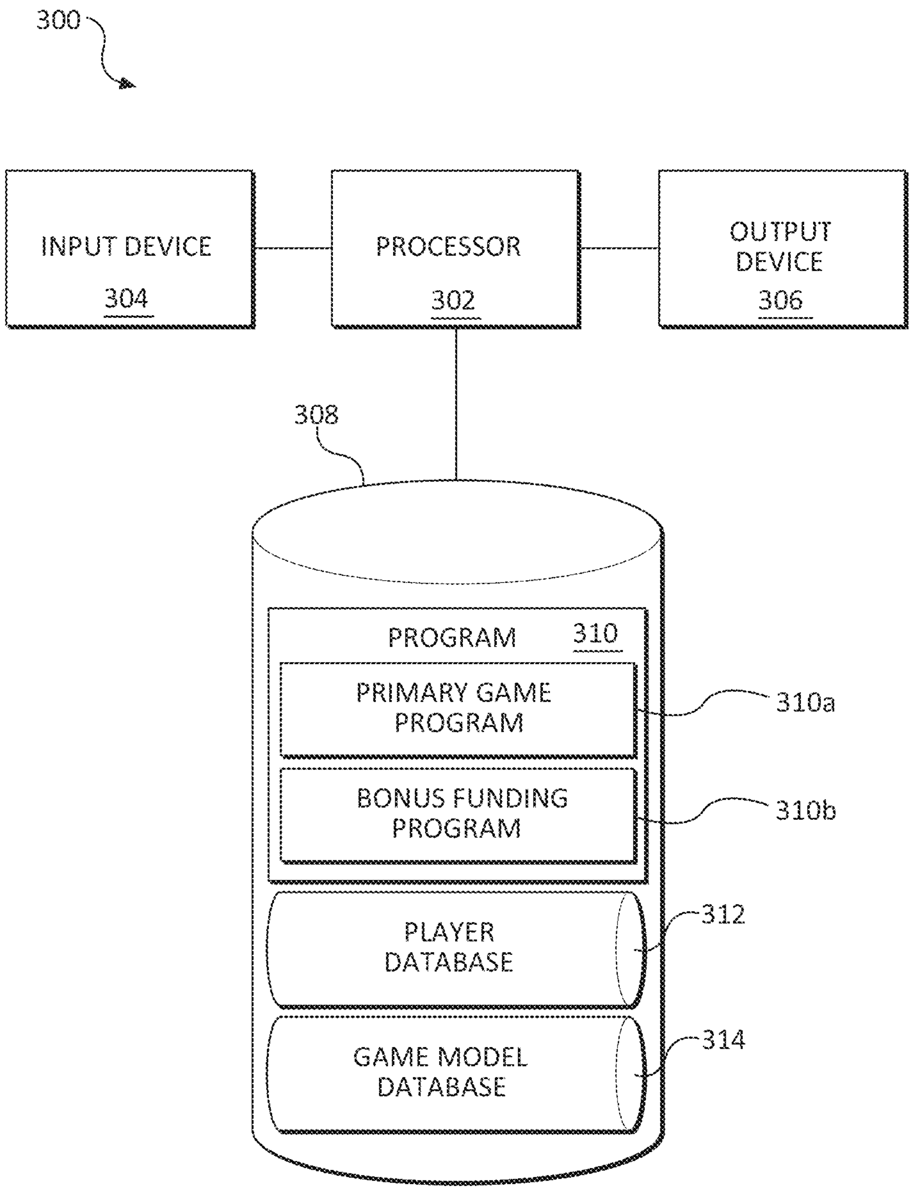
FIG. 3 is a block diagram of an embodiment of an apparatus useful in a system according to one or more embodiments described herein.

FIG. 3 is a block diagram of an apparatus 300 according to some embodiments. In some embodiments, the apparatus 300 may be similar in configuration and/or functionality to any of the player devices 102, the game server 110 and/or another server device operable to facilitate the embodiments described herein. The apparatus 300 may, for example, execute, process, facilitate, and/or otherwise be associated with processes 700 described herein in conjunction with FIG. 7. In some embodiments, apparatus 300 may comprise one or more servers of a game provider which provides one or more qualifying games and manages bonus funding accounts for players, as described herein.

In some embodiments, the apparatus 300 may comprise a processor 302, an input device 304, an output device 306 and/or a memory device 308. Fewer or more components and/or various configurations of the components 302, 304, 306 and/or 308 may be included in the apparatus 300 without deviating from the scope of embodiments described herein.

According to some embodiments, the processor 302 may be or include any type, quantity, and/or configuration of processor that is or becomes known. The processor 302 may comprise, for example, an Intel® IXP 2800 network processor or an Intel® XEON™ Processor coupled with an Intel® E7501 chipset. In some embodiments, the processor 302 may comprise multiple inter-connected processors, microprocessors, and/or micro-engines. According to some embodiments, the processor 302 (and/or the apparatus 300 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 304 and/or the output device 306 are communicatively coupled to the processor 302 (e.g., via wired and/or wireless connections and/or pathways) and they may generally comprise any types or configurations of input and output components and/or devices that are or become known, respectively.

The input device 304 may comprise, for example, a keyboard that allows an operator of the apparatus 300 to interface with the apparatus 200 (e.g., by a player, an employee or other worker affiliated with either an online casino or other entity operating a system which provides games to players). In some embodiments, the input device 304 may comprise a mechanism configured to indicate to a remote server device an initiation or triggering of an event instance (e.g., that a player has actuated a "reel spin" mechanism and thus initiated a new spin of a reels-based game), such information being provided to the apparatus 300 and/or the processor 302.

In some embodiments, the input device may comprise a key on a keyboard of the apparatus 300. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a touchscreen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 306 may, according to some embodiments, comprise a display screen and/or other practicable output component and/or device that is operable to output information. The output device 306 may, for example, comprise a display screen via which are output instructions, guidance, questions or information to a player of an online game. For example, the output device may output a game interface for a game (e.g., a primary aspect of the game or a bonus aspect of the game) which indicates that the player has qualified for a bonus, that an activity or result of the player has qualified or potentially qualified (in embodiments in which additional conditions need to be satisfied) a friend for a bonus or reward from the friend's bonus funding account. Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 304 and/or the output device 306 may comprise and/or be embodied in a single device such as a touch-screen monitor.

In some embodiments, the apparatus 300 may comprise any type or configuration of communication device (not shown) that is or becomes known or practicable. For example, the apparatus 300 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., an initiation of an event instance) to a server (e.g., game server 110) in communication with a plurality of player devices 102. According to some embodiments, the communication device may also or alternatively be coupled to the processor 302. In some embodiments, the communication device may comprise an IR, RF, Bluetooth™, and/or Wi-Fi® network device coupled to facilitate communications between the processor 202 and another device.

The memory device 308 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 308 may, according to some embodiments, store a program 310 for facilitating one or more of the embodiments described herein, which program may include a primary game program **310*a* for facilitating a primary aspect of a game and a bonus funding program 310*b* for facilitating the administration or management of bonus funding accounts for players. In some embodiments, the primary game program 310*a* and/or the bonus funding program 310*b* may be utilized by the processor 302 to provide output information via the output device 306. In some embodiments apparatus 300 may store multiple primary game programs 310 (e.g., one for each game offered by the entity operating apparatus 300). In some embodiments apparatus 300 may store multiple bonus funding programs. For example, in some embodiments a bonus funding account of a player may be game-specific. In such embodiments, a distinct bonus funding program 310*b* may be utilized for each qualifying game which facilitates bonus funding accounts for players. In other embodiments, a single bonus funding program 310*b*** may be operable to facilitate the management of bonus funding programs for a plurality of games (even if each qualifying game provides for a distinct bonus funding account for a given player).

The primary game program **310*a* and/or the bonus funding program 310*b*** may, for example, provide instructions (i) for determining an outcome for the primary game, (ii) determining whether a player should be (or has been) provided with an outcome which comprises a qualifying event and/or another type of qualifying event; (iii) incorporating a bonus provided to a player in accordance with embodiments described herein into play of either the primary game or the bonus round; and/or (iii) for determining whether a game event which qualifies the player for entry into the bonus round has been achieved. With respect to (ii), applicants note that in some embodiments each symbol position or set of symbol positions (e.g., a payline) of the primary game interface (e.g., each symbol position of each reel or a set of symbol positions across a plurality of reels in a reeled slot machine themed game) may have associated therewith a respective probability of having a qualifying symbol or qualifying set of symbols, as the case may be, be placed thereon. A qualifying symbol or qualifying set of symbols may refer, for example, to a symbol or set of symbols which, when output to the player as an outcome of a game instance, comprises a qualifying event. In some embodiments, all symbol positions may be weighted the same (e.g., probability of a qualifying symbol appearing in the symbol position may be the same for each symbol position) while in other embodiments different symbol positions may be weighted differently and/or such a probability for one or more of the available symbol positions may be modified as a session progresses or based on other factors (e.g., a player rating, a player gaming history, a duration of time since the last time the player achieved a qualifying event, an average wager of the player and/or a balance of a bonus funding account associated with the player). For example, it may become more likely that a qualifying symbol appears on one or more symbol positions after X many game instances since the last time a player achieved a qualifying event, after X many game instances in which a qualifying symbol did not appear, after the player has accumulated a Y balance in his/her bonus funding account, etc.

In some embodiments, at least one of the primary game program **310*a* and the bonus funding program 310*b* may further cause a determination of which type of symbol to output on which available symbol position of the primary game interface. For example, in some embodiments certain types of special symbols (e.g., certain scatter-type symbols) may cause a bonus round to be initiated if they appear on the game interface, along an active payline of the primary game interface and/or in a minimum quantity for a given game instance. Accordingly, the primary game program 310*a* may cause a processor to determine which, how many, or where bonus round triggering symbols should be output for a game instance of a primary game. In other embodiments, different types of special symbols may cause different respective bonuses to be provided to the player playing the game and/or a qualifying friend of the player in at least one of the primary game and a bonus round. Thus, in some embodiments, at least one of the primary game program 310*a* and the bonus funding program 310*b*** may comprise determining which such bonus should be provided to the player and outputting the appropriate corresponding symbol on a game interface to the player.

Returning again to the description of memory device 308, in some embodiments such memory device 308 may further store a player database 312 and/or a game model database 314. In accordance with some embodiments, such databases 312 and/or 314 may comprise respective tables utilized to determine to whom (e.g., to which qualifying friend of a player) a bonus should be provided and/or a type of bonus to be provided. For example, the player database 312 may comprise one or more tables for determining (i) one or more players (e.g., friends) associated with a given player, (ii) an average bet size of a given player (e.g., in embodiments involving a wagering game); (iii) a balance of a bonus funding account associated with a given player; and (iv) whether the player has any unredeemed or unclaimed bonuses available. With respect to the game model database 314, such a database may be useful in embodiments in which different types of bonuses are available for provision to a player (E.g., as a result of another player with whom the player is associated). The game model database 314 may store different available game models or bonus schemes and a probability weighting or other indicator useful for determining which of the available bonuses is to be provided to the player.

The apparatus 300 may function as a computer terminal and/or server of an online casino or other entity operating to provide online games, receive and/or manage information related to online games. In some embodiments, the apparatus 300 may comprise a web server and/or other server device operable to accept wagers and determine random numbers based upon which outcomes for wagering games are determined. In some embodiments, the apparatus 300 may comprise an apparatus that is operable to interact with a player of an online game. In some embodiments, apparatus 300 may comprise a plurality of devices working together to accomplish the functionality described herein with respect to FIG. 3.

Although the databases 312 and 314 are described as being stored memory device 308 of apparatus 300, in other embodiments some or all of these databases may be partially or wholly stored, in lieu of or in addition to being stored in memory device 308 of apparatus 300, in a memory of one or more other devices. Such one or more other devices may comprise, for example, another computing device with which apparatus 300 is operable to communicate. Further, some or all of the data described as being stored in the memory device 308 may be partially or wholly stored (in addition to or in lieu of being stored in the memory device 308) in a memory of one or more other devices. Such one or more other devices may comprise, for example, a remote storage service server (e.g., an online back-up storage server, as would be understood by one of ordinary skill in the art).

Figure 4:
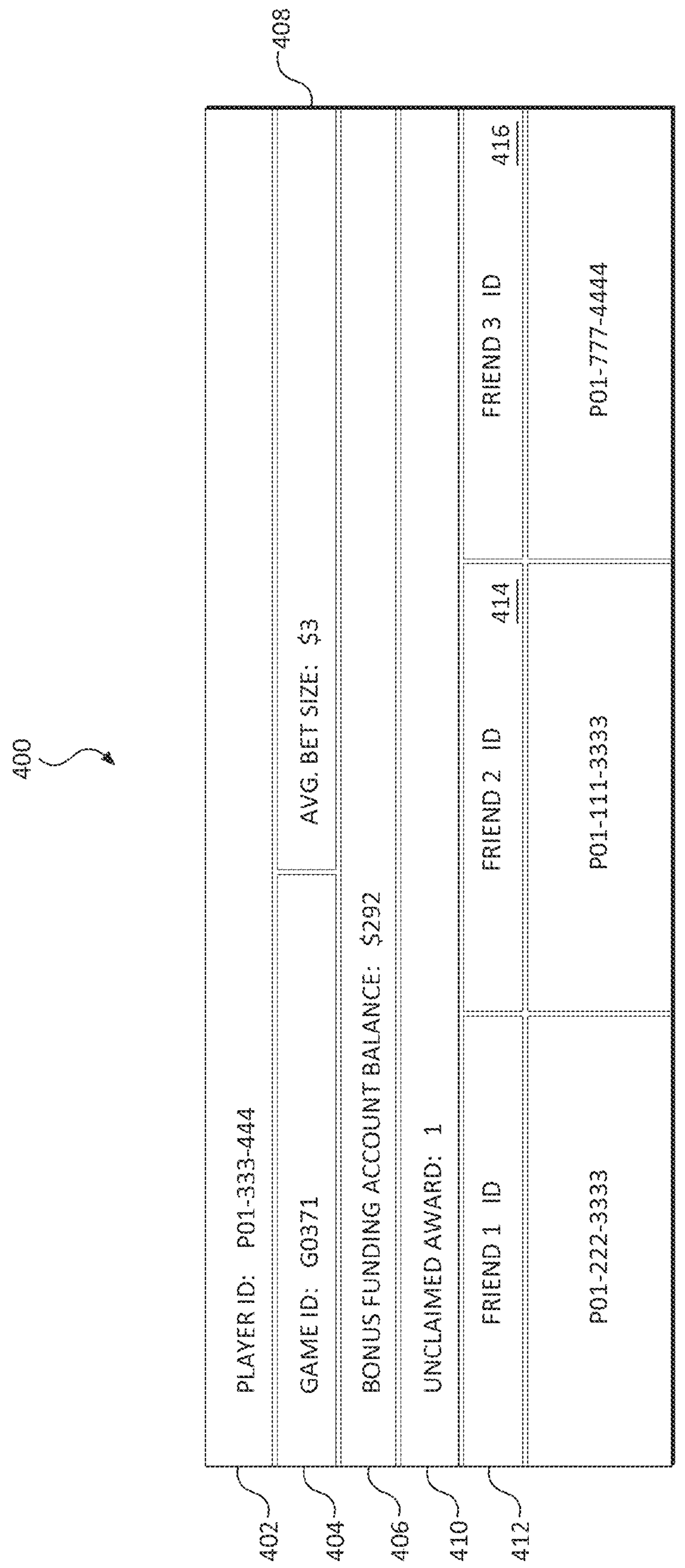
FIG. 4 is an example table of a player database consistent with at least some embodiments described herein.

Referring now to FIG. 4 and FIG. 5, illustrated therein are respective example structures and sample contents of some databases which may be useful in some embodiments. The specific data and fields illustrated in FIGS. 4 and 5 represent only some embodiments of the records that may be stored in such databases. The data and fields of such a databases can be readily modified, for example, to include different, more or fewer data fields and/or contents to be stored therein. A single database that is a combination of multiple databases, or a configuration that utilizes multiple databases for a single database illustrated herein may also be employed. Note that in the databases of FIGS. 4 and 5, a different reference numeral is employed to identify each field. However, in at least one embodiment, fields that are similarly named (e.g., a player identifier) may store similar or the same data in a similar or in the same data format.

As will be understood by those skilled in the art, the schematic illustration and accompanying descriptions of data contained in the sample databases presented herein is an exemplary arrangement for stored representations of information. Any number of other arrangements may be employed besides those suggested by the tables shown. For example, the embodiments described herein could be practiced effectively using more functionally equivalent databases. Similarly, the illustrated entries of the databases represent exemplary information only; those skilled in the art will understand that the number and content of the entries can be different from those illustrated herein. Further, despite the depiction of the databases as two distinct tables, a relational database model employing multiple related tables or an object-based model could be used to store and manipulate the data types of one or more embodiments. Likewise, object methods or behaviors can be used to implement the processes of one or more embodiments.

Turning now to FIG. 4 in particular, illustrated therein is a tabular representation 400 of an example embodiment of a record of player database 312 (e.g., as it may be stored in memory device 308 of apparatus 300 and/or in a memory of another device). Tabular representation 400 is referred to herein as player database record 400. The player database record 400 includes a number of fields, each defining data corresponding to the particular player defined by the record, at least some of which data may be useful in some embodiments to determine a qualifying friend of the player or a bonus value or other characteristic of a bonus to be provided to the player defined by the record. The fields specify: (i) a player identifier 402 (which uniquely identifies a player); (ii) a game identifier 404 (which uniquely identifies a game); (iii) a balance funding account balance 406 (which defines an amount of value accrued in the player's bonus funding account, which may be monetary as illustrated or non-monetary in other embodiments); (iv) an average bet size 408 (which may be updated periodically or non-periodically, such as upon each wager or bet made by the player, upon a passing of a predetermined time interval since a last update thereof); (v) an unclaimed award indicator 410 (which may indicate whether a player has an unclaimed award waiting for him/her, a type of award, a number of such awards and/or other information pertaining to such awards); and (vi) a plurality of friend identifiers 412-416, each uniquely identifying a respective other player who is associated with the player corresponding to the player database record 400. With respect to game identifier 404, it should be noted that in accordance with some embodiments a bonus funding account may be game-specific. Thus, in some embodiments in which multiple games have bonus funding account functionality as described herein, a particular player may have a plurality of bonus funding accounts (each bonus funding account corresponding to a different game, wherein value in each such bonus funding account may accrue (at least in some embodiments) based on wagers made by the player for each such game). In accordance with some embodiments, a record of a player such as that illustrated in player database record 400 may be accessed by a system to, for example, perform one or more of the following determinations: (i) determine whether a player qualifies to receive a bonus funded out of the player's bonus funding account (e.g., the player's record may be accessed based on the player's player identifier being stored as a friend identifier in the record of another player and it being determined that the other player has achieved a qualifying event), such as based on the player's balance of the bonus funding account, an average bet size or whether the player has any unclaimed awards; (ii) determining a value of a bonus to be provided to the player (e.g., based on the balance of the player's bonus funding account as defined in the record); and/or a (iii) determining a type of bonus to be provided to the player (e.g., based on information about unclaimed bonuses of the player or an average bet size of the player, as will further be described with respect to FIGS. 5 and 7).

In accordance with some embodiments, if a player achieves a qualifying event, the player database record corresponding to the player may be accessed to determine whether there are any friends associated with the player in the record, who may qualify to receive a bonus funded out of their respective bonus funding accounts based on the achievement of the qualifying event. In some embodiments, a player who has achieved a qualifying event (thus qualifying one or more of his/her friends to receive a bonus funded out of the friend(s)' bonus funding account) may be provided an opportunity to select which of the friends (if any) are to receive bonuses. For example, the player who achieved the qualifying event may be presented with a list or menu of friends who are qualified (or may be determined to be qualified, based on other conditions not yet verified) to receive such awards and may select the ones to which the awards are to be provided. In some embodiments, the friends of the player may not be stored by the apparatus 300 but may rather be stored by another server or service (e.g., a social networking service which supports the game via which the player achieved the qualifying event), in which case the third party server or service may be queried for a list of the friends associated with the player who achieved the qualifying event. Such a list may be updated or modified over time such that the third party server or service may need to be queried each time the player achieves a qualifying event, for an updated list of the player's friends.

Referring now to FIG. 5, illustrated therein is a tabular representation 500 of an example embodiment of a game model database 314 (e.g., as it may be stored in memory device 308 of apparatus 300 and/or in a memory of another device). Tabular representation 500 is referred to herein as game model database 500. The game model database 500 includes a number of records, each record defining a respective type of available bonus or award which may be awarded to a player and funded out of the player's bonus funding account. In accordance with some embodiments, which type of bonus or award is provided to the player is determined based on the corresponding probability associated with each type of available bonus and a value of a variable "R." In accordance with some embodiments, R is defined for a player at the time the bonus type is being determined and is defined as:

$$R=[\text{current balance of the player's bonus funding account}]/[\text{average bet size of player}]$$

In some embodiments, the average bet size may be determined based on wagers made by the player (the terms "bet" and "wager" are used interchangeably herein), since the last time a bonus was funded for the player out of the player's bonus funding account, in the play of the game (e.g., the primary mode of the game) in which the qualifying event was achieved by the player who caused the subject player (i.e., the player for whom R is being determined) to potentially qualify for a bonus. In accordance with some embodiments, the example types of bonuses which may be available for awarding to a player include (i) a number of spins or other game instances (e.g., in a bonus round of the game, such as spins of a bonus wheel via which the player may win prizes); (ii) an instant win of cash, other monetary value, virtual currency or non-monetary value (in which embodiments the amount or magnitude of such instant win may need to be determined if this is the type of award to be provided to the player); (iii) a pick bonus; and (iv) a number of free spins or other game instances of the primary game. Of course, in some embodiments only one type of bonus may be made available (e.g., a number of credits, cash or virtual currency units, which may be based on the balance of the player's bonus funding account), in which case determining the type of bonus or award to provide to the player may be unnecessary. In embodiments in which different types of bonuses or awards are available, a mechanism such as that exemplified in table 500 may be useful.

Turning now again to FIG. 5, the game model database 500 further includes a plurality of fields for each record, the fields specifying: (i) a number of spins 502 (which, in accordance with some embodiments, indicates the number of spins required to have the R variable in the corresponding range, assuming the average bet size for the player does not change during these spins); (ii) an R Lower Bound 504; (iii) an R Upper Bound 506; (iv) a "nothing" field 508 (which indicates a probability that the player is to not receive any bonus as a result of a particular bonus determination); (v) an Instant Cash Win 510 (which indicates a probability that the player is to receive an instant cash win bonus); (vi) a Pick Bonus 512 (which indicates a probability that the player is to receive a pick bonus; (vii) a free spins bonus (which indicates a probability that the player is to receive a number of free spins). With respect to the number of spins field 502, this is the number of spins for the lower bound. Thus, in accordance with some embodiments once R is calculated for a particular player, the table illustrated in FIG. 5 may be used to determine the type of bonus to be provided to the player (e.g., if R is less than 2, it can be appreciated from table 500 that the player will not receive any bonus, but if R is 5 then the player will receive an instant cash win (the value or amount of which may be determined, for example, randomly, based on a balance of the player's bonus funding account or a combination thereof). Various mechanisms for determining a value of a bonus are described elsewhere herein.

Any or all of the exemplary instructions and data types described herein (including but not limited to with respect to FIGS. 3, 4 and 5) and other practicable types of data may be stored in any number, type, and/or configuration of memory devices that is or becomes known. The memory device 308 may, for example, comprise one or more data tables or files, databases, table spaces, registers, and/or other storage structures. In some embodiments, multiple databases and/or storage structures (and/or multiple memory devices 308) may be utilized to store information associated with the apparatus 300. According to some embodiments, the memory device 308 may be incorporated into and/or otherwise coupled to the apparatus 300 (e.g., as shown) or may simply be accessible to the apparatus 300 (e.g., externally located and/or situated).

Figure 6A:
FIG. 6*a* is an illustration of one example game interface (e.g., a screen shot of an online game) consistent with at least some embodiments described herein.
Figure 6B:
FIG. 6*b* is an illustration of one example of another game interface (e.g., a screen shot of an online game) consistent with at least some embodiments described herein.
Figure 6C:
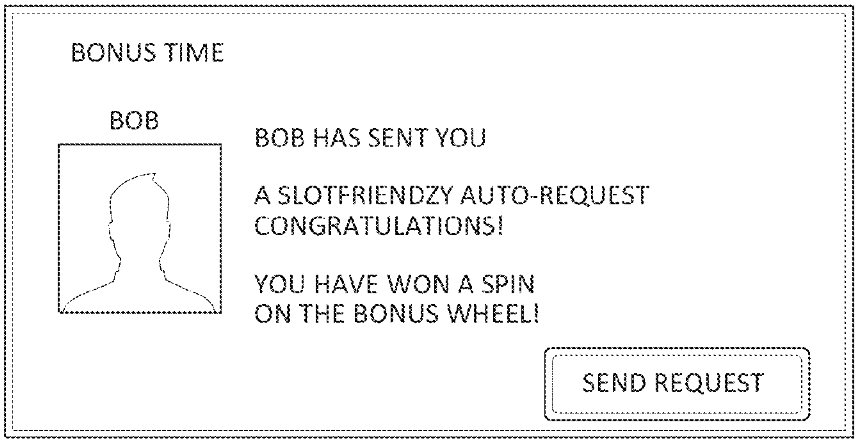
FIG. 6*c* is an illustration of one example of another game interface (e.g., a screen shot of an online game) consistent with at least some embodiments described herein.

Turning now to FIGS. 6*a* through 6*c*, illustrated therein are respective example game interfaces illustrating examples of outputting information to a player in accordance with some embodiments described herein. In particular, FIG. 6*a* illustrates one example of an interface or message which may be output to a qualifying friend who has been qualified to receive a bonus or award (funded, in accordance with some embodiments and unbeknownst to the qualifying friend, out of the qualifying friend's bonus funding account) based on another player achieving a qualifying event. For example, if a player "Jane" has achieved a qualifying event while playing a particular game, a friend of Jane's who is associated with Jane in a database such as the player database illustrated in FIG. 5, may be informed (e.g., if it is determined that this friend has satisfied additional conditions or requirements for receiving a bonus or award funded out of the friend's bonus funding account) of the bonus. Such a message as illustrated in FIG. 6*a* may be output to the receiving qualifying friend, for example, as soon as it is determined that the qualifying friend is to be provided the bonus (e.g., if the qualifying friend is currently playing the game or on a website of the gaming establishment, the message may be output to the qualifying friend via a pop-up window or message; otherwise the message may be e-mailed or texted to the qualifying friend). In some embodiments, a message such as that illustrated in FIG. 6*a* may be queued up and output to the qualifying friend the next time the player logs into a website or game (e.g., the next time the qualifying friend logs into a website of the gaming establishment or social network which supports the game). The interface of FIG. 6*a* includes, in accordance with some embodiments, a link or button which the player to whom it is output may actuate to redeem the bonus.

FIG. 6*b*, on the other hand, illustrates one example of a game interface or message which may be output to the player who has achieved a qualifying event and thus qualified one or more friends for an award to be funded out of each respective friend's bonus funding account (or at least preliminarily qualified, pending a determination of whether the friends of the player satisfy further conditions for receiving an award, which may be the case in some embodiments). For example, the player "Jane" referred to in the message of FIG. 6*a* may be provided with the message of FIG. 6*b*. In accordance with some embodiments, a message such as that illustrated in FIG. 6*b* may further include information (e.g., names) of specific friends and/or bonuses to be provided as a result of the player achieving the qualifying event. In accordance with some embodiments, the player who achieved the qualifying event may be provided with an opportunity to select or agree with which of his/her friends are to be provided with a bonus.

FIG. 6*c* illustrates an alternate embodiment for outputting a message to a qualifying friend, informing the qualifying friend that another player has achieved a qualifying event which has caused the qualifying friend to receive a bonus. For example, the message of FIG. 6*c* may be output to the qualifying friend as a posting, message or update on the qualifying friend's "home page" or other page of a social networking site. In accordance with some embodiments, the message may characterize the bonus as a "gift" provided to the qualifying friend by the player who achieved the qualifying event.

Figure 7:
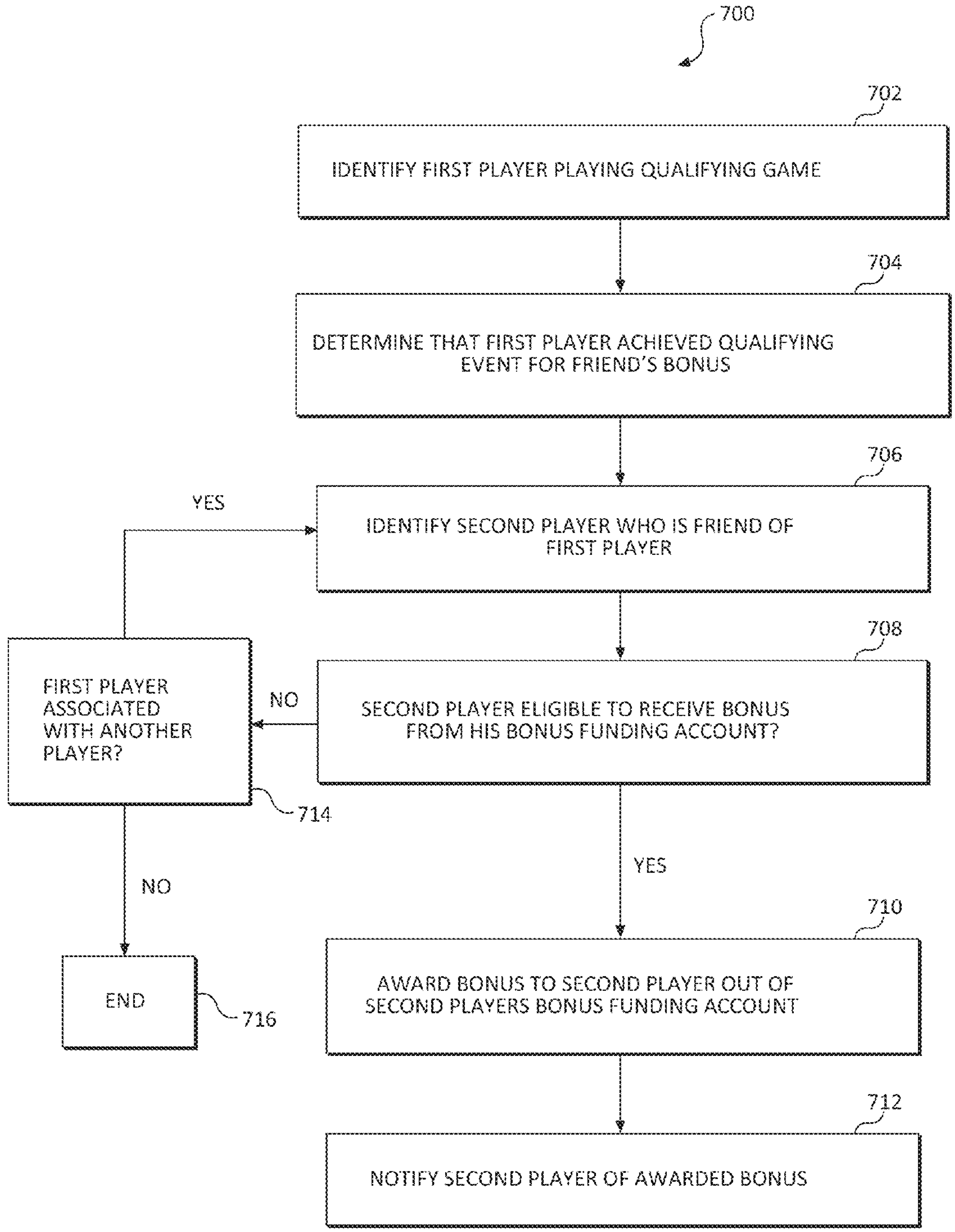
FIG. 7 is a flowchart illustrating a method according to one or more embodiments described herein.

Referring now to FIG. 7, illustrated therein is a flowchart of an example process 700 consistent with some embodiments described herein. It should be noted that process 700 is exemplary only and should not be construed in a limiting fashion. For example, additional and/or substitute steps to those illustrated may be practiced within the scope of the present invention and in one or more embodiments one or more steps may be omitted or modified. Similarly, the steps may be performed in a different order from that illustrated in FIG. 7, as is reasonable and desirable. In one embodiment, the process 700 is performed by apparatus 300 (FIG. 3), a player device and/or a third party device (e.g., a server facilitating a social networking website via which a game is supported).

The process 700 begins with identifying a first player who is playing a qualifying game. This step may comprise, for example, determining that a player has initiated a game which supports the awarding of bonuses from a bonus funding account. In accordance with some embodiments, not all game made available by a game provider or gaming establishment may support bonuses funded by accruing value for a player in a bonus funding account. In accordance with some embodiments, step 702 (or another process or step) may cause one or more subroutines or processes to be invoked or initiated. For example, in some embodiments a process of accruing value to the player's bonus funding account based on wagers made by the player while playing the qualifying game or other qualifying game activity may be initiated once it is determined that the player is playing a qualifying game (such a process may automatically be launched in some embodiments every time the game is played by a player who has an associated bonus funding account). As described herein, a bonus funding account may be specific to a particular game. In some embodiments, the mathematical model of a game may be modified from a default model to account for the monies being diverted to players' bonus funding accounts in order to fund bonuses during game play. For example, the RTP of a game may be reduced in some embodiments to account for a portion of each wager made by a player of the game being accrued to that player's bonus funding account and used to fund bonuses for the player.

In some embodiments, a predetermined percentage or portion of each wager made by a player while playing the qualifying game is diverted to the player's bonus funding account. For example, in some embodiments the following subroutine or process may be carried out once it is determined that a player is playing a qualifying game: (i) recognize wager made by player on event instance of game; (ii) accrue X % of wager to player's bonus funding account; (iii) accrue Y % of wager to a progressive jackpot balance (if there is one for the particular qualifying game); (iv) play game by game engine; and (v) send result of event instance to flash memory of player device (e.g., no win or line win). In such embodiments, the player's personal bonus funding account may increase based on each wager made by the player. In some embodiments, only portions or percentages of wagers made in a primary game may accrue to the player's bonus funding account while in other embodiments portions or percentages of wagers made in bonus games may also be accrued to the player's bonus funding account. In some embodiments, the percentage or portion of wagers made by a player that are accrued to the player's bonus funding account may be adjusted or selected based on information associated with the player (e.g., a rating or category associated with the player, an average wager made by the player, a frequency of the player's play, a status of the player's membership, a current promotion, etc.). For example, a "high value" player (player who has a high value to a gaming establishment or game provider) may accrue value to his/her bonus funding account (e.g., such that more generous and/or more frequent bonuses may be funded for the player) at a more rapid rate by having a larger percentage of each wager accrue to the player's bonus funding account.

In accordance with some embodiments, a varying portion, percentage or amount of each wager made by a player may be accrued to the player's bonus funding account, such that the specific portion or amount may vary from one wager to another. In one example embodiment, the amount or portion of any given wager may be determine such that average amount or portion conforms to some predetermined target amount or portion (e.g., a volatility index may be utilized to determine the particular amount or portion of a given wager to contribute to the player's bonus funding account).

An example of a scheme for contributing or accruing value (whether in a predetermined or varying amount) to a player's bonus funding account in a non-wagering game or environment may include adding value to the account for a qualifying action the player undertakes in the game (e.g., a purchase the player makes in association with the game or an accomplishment the player achieves in the game). For example, a value of virtual currency or other non-cash value may be added to a player's bonus funding account for each level the player advances in the game or other progress the player makes in the game, each time the player improves a skill or quality of his character in the game or each time the player launches the game.

Returning now to process 700, in step 704 it is determined that the first player has achieved a qualifying event. In some embodiments, step 702 may be omitted and process 704 may be initiated upon it being determined that a player playing a qualifying game has achieved a qualifying event (e.g., a routine of the game may call up process 700 upon recognizing that a player has achieved a qualifying event or a monitoring service or subroutine may continuously (or, e.g., periodically) monitor qualifying game(s) being played and call up process 700 upon a qualifying event being achieved or recognized by the monitoring service or subroutine). In some embodiments, game logic of a qualifying game may include initiation of process 700 (or the transmission of a message or signal which results in process 700 being initiated) upon certain events (e.g., qualifying events) occurring during game play of a qualifying game. For example, certain outcomes and/or results (e.g., certain symbols along a payline of a game or the player qualifying for a bonus round of the game) may cause process 700 to be initiated. Other examples of qualifying events which, when achieved by a player, cause a process of determining whether any friends of the player qualify to receive a bonus out of their respective bonus funding accounts include, without limitation, (i) the player qualifying for a particular advancement, level, round or aspect of the game; (ii) the player winning a payout or other award of at least a minimum value; (iii) the player obtaining a winning outcome after a predetermined number of losing outcomes; (iv) the player receiving a specific symbol or set of symbols along a payline of the game; (v) a progressive jackpot (or portion thereof) being won by the player; (vi) a player unlocking or gaining access to a feature of the game; (vii) the player returning to play in less than a predetermined amount of time to play the game since the last time the player played the game; and/or (viii) the player's credit balance reaching a predetermined minimum amount. It should be understood that when it is described herein that a qualifying event is "achieved" by a player, the usage of the term "achieved" is not intended to imply that any type of skill, intent or attempt by the player to so obtain the qualifying event is necessary or required. While in some embodiments at least some skill of the player may be involved in the player achieving a qualifying event, in other embodiments the qualifying event is obtained by the player based on a random or pseudo-random determination by a game engine (e.g., based on a random number generated or selected by a random number generator associated with play of the game). It should further be understood that none of the embodiments described herein are limited to any particular nature of the qualifying event and any desirable type of qualifying event may be utilized.

Once it is determined that the player has achieved a qualifying event, a second player who is a friend of the first player is identified (in step 706). For example, an identifier of the player who achieved the qualifying event may be determined and a record of a player database accessed to determine whether the player is associated with any other players in the record (e.g., a record such as the record 400 of FIG. 4). In some embodiments in which the player is playing a game via a social network site operated by a third party, the third party server or service may be queried to identify any friends of the player who are associated with the player via the social network site. In some embodiments, such a query may be limited to those friends of the player who are also registered players of the game. In some embodiments, step 706 may comprise receiving an indication, identifier or selection of the second player from the first player who achieved the qualifying event. For example, the first player may be prompted to enter a name or other identifier of a friend who should possibly receive a bonus or may be provided with a list or menu of available friends and be prompted to select one or more of such friends for possible receipt of a bonus.

Once a second player is identified in step 706, in step 708 it is determined whether the second player qualifies to receive a bonus funded out of the second player's bonus funding account (i.e., in some embodiments a friend must satisfy one or more additional conditions in addition to being a friend associated with the player who achieved the qualifying event). For example, in some embodiments a friend may only qualify to receive a bonus out of the friend's bonus funding account if the player satisfies a condition such as: (i) having a sufficient amount of value accrued in the player's bonus funding account (e.g., a balance of the bonus funding account must be at least X, which may be zero or an amount greater than zero); (ii) not having had a bonus funded out of the bonus funding account for at least a minimum amount of time; (iii) be currently playing the qualifying game; (iv) not be currently playing the qualifying game; (v) not be currently playing in a bonus round of the qualifying game; (vi) have an average bet of at least a predetermined magnitude; or (v) not have an unredeemed previously issued bonus pending. Of course, any number and combination of the above example conditions may need to be satisfied and other conditions may be utilized. In some embodiments, a friend need not satisfy any other conditions other than being an associated friend of the player. For example, in some embodiments even if the friend has no value accrued in the friend's bonus funding account the player may still qualify to receive an award funded out of his/her bonus funding account (as is described in more detail below). Thus, in step 708 information associated with the second player identified in step 706 is retrieved, any conditions for qualifying for a bonus out of a bonus funding account based on the achievement by the first player of step 702 of the qualifying condition are identified and it is determined whether the second player qualifies to receive a bonus out of the second player's bonus funding account. For example, a current status of the second player/friend may be determined (e.g., to see if the friend is currently playing the game, if this is relevant to the determination) or a record of the second player may be retrieved based on an identifier of the second player (e.g., from a player database, such as that illustrated in FIG. 4) to retrieve other relevant data (e.g., whether the second player has an unredeemed bonus, the second player's average bet amount, etc.).

If it is determined in step 708 that the second player identified in step 706 does qualify to receive a bonus out of the second player's bonus funding account, process 700 continues to step 710 (wherein a bonus is awarded to the second player). If, on the other hand, it is determined that the second player identified in step 706 does not qualify for a bonus, the process 700 continues to step 714, where it is determined whether the first player who achieved the qualifying event is associated with another friend/second player. If not, the process 700 ends. If so, the process 700 returns to step 706, wherein this other friend of the first player is identified (e.g., a player identifier of this other friend is retrieved from a player database, identified by the first player or received from a third party service) and continues again to step 708, wherein data associated with the next friend/second player is evaluated to determine whether this friend qualifies to receive a bonus out of his/her bonus funding account.

In step 710 a bonus is awarded to the second player out of the second player's bonus funding account. Awarding a bonus may comprise, for example, deducting an amount of value (e.g., an amount of value based on a value associated with the awarded bonus) from the second player's bonus funding account and storing an indication of the bonus (and the value thereof) in association with the second player (e.g., in a record of a player database which corresponds to the second player). In one example embodiment, determining the value to deduct from the second player's bonus funding account is a determination which may be based generally on the expected net loss (to the gaming establishment or game provider) of the bonus (e.g., a loss per spin of a bonus wheel with prizes, if the bonus comprises spins of the bonus wheel). In some embodiments the value of the bonus provided may be based on the bet size (e.g., current average bet size associated with the player or bet size determined for use in the bonus) and the bonus model chosen (this could be fixed). An example of selecting a bonus model is described in more detail below. In one example, assuming a player's bonus funding account balance is $5 and the player's current bet size is $1, the value by which the player's bonus funding account balance is reduced may be based on the RTP of the bonus model chosen for the bonus to be awarded to the player. In some embodiments if the RTP<=100% then no amount of value may be deducted from the player's bonus funding account. But, in another example, if the RTP is 300% and the expected loss per spin is $2 (again, assuming the bonus comprises spins of a bonus wheel), the balance of the player's bonus funding account may be reduced by $2 for each spin. In the preceding example however, in embodiments in which the player's bonus funding account is not allowed to go below zero, the player would only be provided with a maximum of two spins of the bonus wheel. Thus, in some embodiments determining how much to reduce a balance of a bonus funding account and/or a value of a bonus to award to the second player (which, in some embodiments, may comprise the same or parallel determinations) may be constrained by the current balance of the second player's bonus funding account. In some embodiments, a maximum and/or minimum bonus value (and/or a maximum or minimum deduction of a balance of a bonus funding account) may be otherwise constrained. For example, predetermined maximum or minimum amounts may be utilized for all players or for players meeting certain characteristics.

In embodiments in which different values and/or types of bonuses may be awarded, step 710 (or another step in process 700 or a separate subroutine) may comprise determining a value of the bonus to be awarded to the second player and/or a type of bonus to be awarded to the second player. These determinations may, in some embodiments, comprise a determination of how much a player's bonus funding account should be reduced by as a result of the awarding of the bonus (while in other embodiments the reduction of the bonus funding account may be a distinct determination).

For example, assuming the bonus type to be awarded is spins of a bonus wheel (e.g., which has different prizes available thereon), the following general methodology may be used to determine how many spins are to be awarded to the second player as the bonus and which of a plurality of bonus mathematical Models (1-7 in the present example) to use, each Model being associated with a different RTP. Assuming there is a maximum deduction (e.g., $100) to a player's bonus funding account per bonus and a minimum number of spins (e.g., 10 spins) to be awarded, a table such as the following may be used to select the Model and number of spins of a bonus wheel to be provided to the player as a bonus:

TABLE 1

Example Spins Model Selection

| Model ID | RTP | Expected House Loss Per Spin | Net Loss Per Spin | Maximum Number of Spins |
|---|---|---|---|---|
| 1 | 96.41% | N/A | N/A | Unlimited |
| 2 | 115.49% | 15.49% | $ 3.10 | 32.27 |
| 3 | 160.07% | 60.07% | $ 12.01 | 8.32 |
| 4 | 199.83% | 99.83% | $ 19.97 | 5.01 |
| 5 | 246.78% | 146.78% | $ 29.36 | 3.41 |
| 6 | 506.50% | 406.50% | $ 81.30 | 1.23 |
| 7 | 1013.56% | 913.56% | $182.71 | 0.55 |

Assuming, in accordance with some embodiments, that the most generous Model (with respect to the player) is to be selected, given the example constraints of at least 10 spins (which can be any number desired) and a maximum deduction of $100 from the player's bonus funding account, it can be appreciated from the above example table that Model 2 should be selected as the most generous Model for the player and the player should be awarded 32 spins (if the preference is to round down) as the bonus. In accordance with some embodiments, the player's bonus funding account may then be deducted by the number of spins to be awarded (32 in the present example, so ($3.10/spin) times 32 spins) at the time the bonus is calculated or as the spins are initiated by the player (e.g., $3.10 deducted from the player's bonus funding account at the time of each spin). Once a Model is selected for a particular bonus for a player, an indication of that Model may be stored in association with the player in a database or the player's game state.

In one embodiment, there may be a further determination of which Model to use for a player at the time of each spin, even if a Model has been selected for a particular bonus awarded. For example, in one embodiment there is a determination of whether to use the Model determined from the above table (Model 2 in the above table) or Model 1 (the default and most generous model) at the time of each of the spins (the 32 spins in the above example, since in some embodiments the initial selection of Model may govern the number of spins awarded). A probability determination may be performed for each spin to select the Model for that spin (e.g., with weightings which may change over the course of the spins, as desired). For example, if for a particular spin Model 2 is chosen then the result of the spin is determined in accordance with Model 2 and $3.10 is deducted from the player's bonus funding account. If, however, Model 1 is chosen for a particular spin, the result of the spin is determined in accordance with Model 1 and no amount is deducted from the player's bonus funding account (at least in accordance with the example data in Table 1 above).

In accordance with some embodiments, only a single type of bonus may be available and thus there may be no need to determine the type of bonus to award to the player (other than perhaps selecting a Model or other characteristic of the type of bonus, as described above with respect to the Table 1 above). For example, in some embodiments the bonus may comprise an amount of credit to be added to a credit balance of the second player, which the second player may then use for wagering in a primary game or bonus round of the qualifying game which resulted in the second player being awarded the bonus (or, in accordance with other embodiments, in a different game). In a non-wagering embodiment, the bonus may comprise an amount of virtual currency to be added to virtual currency account of the player, which the player may then use to purchase items, features or advancements available in a game (e.g., the qualifying game which resulted in the second player being awarded the bonus). In another example, one or more spins of a "bonus wheel" may be the type of bonus, wherein different prizes are available as results of spinning the wheel. In an embodiment in which the type of bonus need not be determined because there is only a single or default type of bonus, there may still need to be a determination of the value of the bonus (e.g., the amount of credit or virtual currency to award, the number of spins on the bonus wheel, etc.).

In embodiments in which a plurality of types of bonuses are available, a process for selecting the type of bonus to award to the player may be initiated. For example, the type of bonus may simply be determined randomly, by use of a random number generator or algorithm. In some embodiments, a process and table such as that described with respect to FIG. 5 may be utilized. For example, the variable R may be determined for the second player based on information associated with the second player (e.g., in a record of a player database) and the type of bonus to award to the player may be determined based on R (and, e.g., a random number algorithm if there is a probability of more than one type of bonus even based on the determined R). In some embodiments, other mechanisms or factors may be utilized to select a type of bonus to provide to the player. For example, a rating or category of the player, a preference of the player, a type of bonus previously awarded to the player, a promotion currently being run, a marketing budget associated with one or more types of bonuses and a balance of the second player's bonus funding account are all non-limiting and non-exhaustive examples of factors which may be utilized to select a type of bonus to award to the player.

In some embodiments it may be desirable or necessary to determine the value of the bonus to award to the second player (in either an embodiment in which a type of bonus was also selected or embodiments in which only a single type of bonus is available). While in some embodiments the value of the bonus may be a predetermined amount (e.g., $10 or 10 points), in other embodiments there may be a need to select the value from a plurality of available predetermined values or calculate a value for the bonus. For example, in one embodiment a predetermined amount may be determined or selected based on the qualifying event achieved by the first player and/or information associated with the first player (e.g., in a bonus pay table, different qualifying events may correspond to different predetermined bonus value amounts and/or a more frequent, successful or valuable first player may qualify a second player for a higher valued bonus). In accordance with some embodiments, a bonus amount may be determined based on a balance of the player's bonus funding account (e.g., $10 or the balance of the player's bonus funding account rounded down to the nearest whole dollar, whichever is greater). For example, in one embodiment the value of the bonus may be determined to be a predetermined percentage of the second player's bonus funding account (e.g., 50%). In some embodiments, the percentage may be selected based on information associated with the player (e.g., a rating or category of the player, how long it has been since the player was last awarded a bonus out of his/her bonus funding account, how long it has been since the player played the qualifying game, a range within which the balance of the player's bonus funding account falls into, etc.). In some embodiments, the percentage may vary.

In accordance with some embodiments, a value of a bonus may be determined to be within a predetermined range or level (e.g., between $5 and $15 or between 5 and 15 points) upon the first player achieving a qualifying event (and upon, in some embodiments, it being determined that the second player qualifies for a bonus based on a satisfaction of one or more additional conditions), but the final value of the bonus may be based on one or more factors. For example, the final value of the bonus may be based on one or more outcomes of a game played by the second player (and/or the second player's actions or decisions) during subsequent game play of a qualifying game. For example, in one embodiment the value of the bonus may be determined to have a theoretical value corresponding to a volatility or probability scheme (e.g., the theoretical value of the bonus is $10 or 10 points but the second player may actually be awarded $5 or $15 (or 5 or 15 points, if it is a non-monetary bonus) as the bonus). In another example, the final value of the bonus may be determined to be within a predetermined range of a target value (e.g., $10+/−$6).

In some embodiments, two or more bonuses (two or more different types and/or values of bonuses) may be determined for the second player. In such embodiments, (i) one of the bonuses may be selected by the system administering process 700; (ii) the first player may be provided with an opportunity to select one of the bonuses for the second player; or (iii) the second player may be offered a choice between the two or more bonuses.

In some embodiments, a value of a bonus awarded to the second player out of the second player's bonus funding account may be limited to the balance of the player's bonus funding account at the time the bonus value is being determined (i.e., the value of the bonus may not be any greater than the balance of the bonus funding account). However, in other embodiments such a limit may not be utilized. For example, in one embodiment a value of a bonus that is calculated or selected and is determined to be greater than a balance of the second player's bonus funding account may nevertheless be awarded to the player. In some embodiments in which this is allowed, the excess value of the bonus awarded (i.e., the value of the bonus beyond the balance of the player's bonus funding account) may be recouped by the game provider during subsequent play of the qualifying game by the second player. For example, the bonus funding account balance may be allowed to become negative and then replenished back towards positive territory as additional value is accrued to the account in any of the manners described herein (e.g., a portion of each wager made by the second player in the qualifying game is added to the balance of the player's bonus funding account). In some such embodiments, the game's mathematical model may be temporarily adjusted such that a greater portion of the player's wagers are added to the player's bonus funding account (e.g., 40% rather than the standard 30%) until the balance of the bonus funding account is greater than zero again. In some embodiments in which the second player is awarded a bonus of a value which exceeds the balance of the player's bonus funding account, the excess value may be categorized as essentially a "loan" to the second player which need be repaid by the player (e.g., unknowingly, since in some embodiments the player may be unaware of the existence of the bonus funding account or that the bonus awarded was funded out of such an account). For example, if 30% of the second player's wagers are normally accrued to the balance of the player's bonus funding account, this percentage may be changed to 0% until the excess value of the bonus is repaid and the 30% of each wager may instead be diverted towards repaying the game provider the excess value. In still another embodiment in which a value of a bonus awarded to the second player exceeds a balance of the second player's bonus funding account, the reels of the base or primary qualifying game may be adjusted such that the RTP of the base or primary game is decreased (e.g., to 55% from 60%) until the expected value of the excess value of the bonus has been recouped. In some embodiments value in a bonus funding account may be accrued from money out of the game provider's marketing budget. In these (and other embodiments) the excess value may not be required to ever be repaid by the player, knowingly or unknowingly.

Of course, many other schemes for determining a value or type of bonus for the second player may be incorporated and the embodiments described herein are not dependent on any particular methodology for determining the type or value of a bonus to award to the second player.

Once a value and type of bonus is determined, the bonus is awarded to the second player out of the second player's bonus funding account (step 712). For example, an indication of the bonus (e.g., including value and type) may be stored in association with the player in a memory (e.g., in a record corresponding to the second player of a player database, such as player database 312). In accordance with some embodiments, a bonus may be "awarded" or provided to the second player by, for example, transferring some or all of the value comprising the bonus in the second player's bonus funding account to another account associated with the second player (e.g., an account which is managed by and accessible to the second player, such as an account of funds which may be used to place wagers on wagering games, a financial account from which the second player may withdraw funds or use funds to place wagers or purchase attributes, skills or other features of a game). In other embodiments, a bonus may be awarded in another manner (e.g., a check may be sent via postal mail to the second player, the second player may be provided with the bonus the next time he visits (e.g., logs into a website of) the gaming establishment or game provider which is providing the bonus, etc.). If a bonus comprises something that is not an amount of value (e.g., credit or virtual currency), such as a spin of a prize wheel, entry into a bonus round or level in a game, an advancement in a game, access to a feature, tool or aspect of a game (e.g., a new tool or weapon for a character of the second player in a role-playing or other game), providing the bonus to the player may comprise storing an indication of the bonus in association with the player such that the bonus may be incorporated into the second player's play of the game once the second player redeems or requests the bonus.

In step 714, the second player is notified of the awarded bonus. For example, an e-mail, status update, social network message or posting, or text message may be sent to the second player, informing him of the first player achieving a qualifying event and/or that the second player has been awarded with a bonus (e.g., as a result of the qualifying event). In some embodiments, the notification or message may include a mechanism (e.g., a link) to allow the player to accept or redeem the bonus. In some embodiments, the notification or message may inform the second player that he has been provided with the bonus as a result of the first player achieving a qualifying event during game play while in other embodiments the first player's qualifying event may not be referred to. In some embodiments, the bonus may be characterized as a "gift" from the first player. In embodiments in which the second player is offered a choice of bonuses, the notification or message output to the player in step 714 may include an indication of the choice (e.g., a link to each of the available bonuses). The example interfaces of FIGS. 6A and 6C comprise respective non-limiting examples of notifications which may be output in step 714.

In some embodiments, at least some of the steps of process 700 (e.g., determining whether a friend of a player qualifies for an award out of the friend's bonus funding account based on the player achieving the qualifying event) may be performed immediately or very soon (e.g., seconds) after the achievement by the first player of a qualifying event, while in other embodiments such steps may be performed some time later. For example, in some embodiments the steps of process 700 which provide for determining which (if any) friends of the first player qualify for an awarded out of their respective bonus funding account (and/or determining the type and/or value of the bonus or award to be provided) may be performed periodically (e.g., nightly, every X hours, etc.) for a qualifying game and the first player's achievement of a qualifying event may simply be stored for reference once the remainder of process 700 is performed.

In some embodiments, process 700 (or another separate process) may include additional steps. For example, a notification or message may be output to the first player that the second player has been awarded the bonus (e.g., as illustrated in the example interface of FIG. 6B) and/or once the second player has redeemed the bonus. In another example, once the second player has redeemed the bonus, an indication of the redemption may be stored in a memory (e.g., a record associated with the second player may be updated to reflect that the second player no longer has an unredeemed bonus pending). In some embodiments, process 700 (or a separate process) may include, upon receiving from the second player a request to redeemed or claim a bonus, an authorization of the request (e.g., determining based on the player identifier and information stored in the player's record of a database that the player has an unredeemed bonus pending). In some embodiments, the bonus funding account of the second player may not be reduced based on the bonus until the player has redeemed the bonus such that process 700 may include a step of reducing the balance of the second player's bonus funding account after the player has redeemed the bonus.

In accordance with some embodiments, what is contemplated is a reward scheme which is personal to a given player and specific to a particular game (i.e., the bonus reward scheme is part of the game mechanics and mathematical model of a particular game, and not a reward scheme for rewarding generally play by a person of a plurality of games across a network). In accordance with such embodiments of the reward scheme, each wager made by a person in a game (or each qualifying action that is not a wager, in the case of a non-wagering game) causes a value or amount of monies to be added to a bonus funding account of the person, such that the value or monies in the account increase over time as the person makes wagers on, or performs actions during, the game (e.g., a portion of each wager made by the player is added to the account). This bonus funding account is tracked and managed in the background and not known, discernible, controlled or manipulated by the person whose bonuses will be funded out of the account (e.g., the person may not even be aware of the existence of the account, much less its current value). The accumulated value or monies in this bonus funding account are then used to fund rewards for bonus rounds or bonus events for the person. In some embodiments bonus events for which rewards are funded out of this account begin to be triggered, qualified for or dispersed once the value of the account reaches a minimum predetermined value.

In accordance with some embodiments, a bonus funding account may correspond to a single person in the sense that the value or monies in the account are used only to fund rewards for that person and bonuses or rewards for other persons may not be funded from that person's bonus funding account (although in some embodiments other person's wagers or playing decisions may cause the value or monies in the account to be increased). The value of a bonus funding account may be persistent over gaming sessions stored in association with the person, such that the person may continue to earn, qualify for or win bonuses funded by the value or monies in the account when the person returns to play the game after having previously stopped playing the game.

In some embodiments, the payback percentage for a base or primary game which includes the reward scheme described above for funding bonuses or rewards as a result of certain qualifying events of the game may be adjusted, such that the overall payback percentage for the game (base aspect of the game and bonus aspect of the game) remains as it was or would have been without the reward scheme. For example, the payback percentage for the base game may be lowered to reflect the payback to the person associated with the bonus funding account as a result of distributions from the account to fund rewards for bonus events.

In accordance with some embodiments, what is provided is a method for facilitating the awards of bonuses in an electronic game playable by a plurality of players, the method comprising: (i) accruing value on behalf of a first player in a bonus funding account, wherein the value being accrued based on game play of the first player and wherein the account is not controlled by the first player; (ii) determining that a second player, associated with the first player in a database, has achieved a qualifying event during game play of a game; (iii) determining whether the first player qualifies to receive a bonus funded out of the bonus funding account of the first player based on the qualifying event of the second player; (iv) if the first player qualifies to receive the bonus, awarding the bonus to the first player, the bonus funded by the bonus funding account of the first player; and (v) deducting a value of the bonus from an accrued value in the bonus funding account of the first player. In accordance with some embodiments, awarding the bonus may comprise transferring the value of the bonus from the bonus funding account of the first player to another account of the first player, the other account being controllable by the first player. In accordance with some embodiments, the method further comprises determining an accrued value of the bonus funding account and determining the value of the bonus to be a predetermined percentage of the accrued value of the bonus funding account.

Rules of Interpretation

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second"

before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

What is claimed is:

1. An apparatus for facilitating provision of a bonus to a player of an online game, the apparatus comprising:

a processor;

a memory storing a program, the processor being operable with the program to:

maintain a bonus funding account for a first player of a first game at least by increasing in real-time based on game activity of the first player a balance of the bonus funding account of the first player, wherein the bonus funding account is specific to the first game and is for funding bonuses for the first player at a discretion of a gaming establishment and is not controllable by the first player;

receive information that a second player who is associated with the first player has achieved a qualifying event;

determine, in response to the second player achieving the qualifying event, that a bonus is to be provided to the first player, the bonus being funded from the bonus funding account of the first player;

generate an online gaming interface for the first player, the online gaming interface comprising a representation of the first game and a button enabling the first player to accept the bonus;

dynamically generate a bonus feature for the first player by:

(a) selecting, from a plurality of available mathematical models, a first mathematical model to be applied by the program in determining a first value defining a bonus award to be provided to the first player;

(b) receiving a random number output from a random number generator;

(c) applying the random number to the first mathematical model to determine a result;

(d) determining the first value based on the result;

(e) modifying the online gaming interface to include a representation of the dynamically generated bonus feature to the first player as a mechanism for providing the first value as the bonus award; and (f) receiving, from the online gaming interface, a signal that the player has actuated the button and therefore accepted the bonus; and decrease, in real-time upon determining that the first player has actuated the button and accepted the bonus, the balance of the bonus funding account by a second value that is different from the first value, the second value being based on a rate of return (RTP) associated with the first mathematical model.

2. The apparatus of claim 1, wherein the processor being operable with the program to increase the balance of the bonus funding account based on gaming activity of the player comprises the processor being operable with the program to increase the balance, upon each placement of a wager by the first player on the first game, by a predetermined portion of each said wager.

3. The apparatus of claim 1, wherein the processor is further operable with the program to increase the balance of the bonus funding account from monies in a marketing budget of the gaming establishment.

4. The apparatus of claim 1, wherein the processor is further operable with the program to:

determine at least one of a type and the value of the bonus, prior to the bonus being provided to the player.

5. The apparatus of claim 4, wherein the processor being operable with the program to determine at least one of a type and the value of the bonus comprises the processor being operable with the program to determine the value of the bonus based on information associated with the first player.

6. The apparatus of claim 5, wherein the information associated with the first player comprises an average wager of the player as determined at a time it is determined the second player achieved the qualifying event.

7. The apparatus of claim 5, wherein the information associated with the first player comprises information indicative of a previous bonus previously funded from the bonus funding account and provided to the first player.

8. The apparatus of claim 5, wherein the information associated with the first player comprises a balance of the bonus funding account at a time it is determined the second player achieved the qualifying event.

9. The apparatus of claim 1, wherein the qualifying event comprises at least one of (i) the second player qualifying, during play of the game, for a bonus round; (ii) the second player qualifying, during play of the game, for award of at least a predetermined magnitude; (iii) the second player qualifying, during play of the game, for at least one of a predetermined award and a predetermined advancement; (iv) the second player achieving a predetermined magnitude of at least one of a level, accomplishment, number of points and score in the game; (v) the second player initiating a session of play of the game; and (vi) the second player funding an account usable for play of the game.

10. The apparatus of claim 1, wherein the processor is further operable with the program to:

store an indication that the bonus is to be provided to the first player;

output a message to the first player, the message informing the player of the bonus;

receiving from the first player a request to redeem the bonus;

authorizing redemption of the bonus by the first player; and storing an indication that the bonus has been redeemed by the player.

11. The apparatus of claim 1, wherein the program being operable with the processor to cause the bonus to be provided to the first player comprises the program being operable with the processor to:

determine that the first player has logged into a website associated with the game; and causing the bonus to be incorporated into the first player's play of the game.

12. The apparatus of claim 1, wherein the second player is associated with the first player in a database, irrespective of gaming devices and gaming activity of either player.

13. The apparatus of claim 12, wherein the processor is further operable with the program to:

receive from one of the first player and the second player a request to be associated with the second player;

receive from the other of the first player and the second player permission to be associated with the one of the first player and the second player from whom the request was received; and update a record in a database to indicate that the first player is associated with the second player.

14. The apparatus of claim 1, wherein the processor is further operable with the program to:

determine, responsive to the determination that the second player has achieved a qualifying event, that data associated with the first player satisfies a condition for a bonus to be funded for the first player out of the bonus funding account based on the achievement by the second player of the qualifying event.

15. The apparatus of claim 14, wherein the processor being operable with the program to determine that data associated with the first player satisfies a condition for a bonus to be funded for the first player out of the bonus funding account comprises the processor being operable with the program to:

determine that the balance of the bonus funding account of the first player is at least equal to a minimum value.

16. The apparatus of claim 14, wherein the processor being operable with the program to determine that data associated with the first player satisfies a condition for a bonus to be funded for the first player out of the bonus funding account comprises the processor being operable with the program to:

determine that an average wager of the first player is at least equal to a minimum average wager.

17. The apparatus of claim 14, wherein the processor being operable with the program to determine that data associated with the first player satisfies a condition for a bonus to be funded for the first player out of the bonus funding account comprises the processor being operable with the program to:

determine that the first player has not received a previous bonus funded from the first player's bonus funding account for at least a minimum predetermined period of time.

18. The apparatus of claim 14, wherein the processor being operable with the program to determine that data associated with the first player satisfies a condition for a bonus to be funded for the first player out of the bonus funding account comprises the processor being operable with the program to:

determine at least one of (i) that the first player has downloaded particular software to a player device of the first player; (ii) that the first player is a member of a specific social networking site; and (iii) that the first player has registered as a player of the game.

19. The apparatus of claim 1, wherein the program being operable with the processor to cause the bonus to be provided to the player comprises the program being operable with the processor to:

transfer an amount of value from the bonus funding account of the first player to a second account of the first player, the second account comprising an account which the first player can control and from which the first player may utilize the value for playing the game.

20. The apparatus of claim 1, wherein the balance of the bonus funding account comprises a balance of at least one of cash value usable for wagering on the game and virtual currency available for playing the game.

21. A non-transitory computer-readable medium storing instructions for directing a processor to facilitate an online game, which instructions when read and executed by the processor cause the processor to:

maintain a bonus funding account for a first player of a first game at least by increasing in real-time based on game activity of the first player a balance of the bonus funding account of the first player, wherein the bonus funding account is specific to the first game and is for funding bonuses for the first player at a discretion of a gaming establishment and is not controllable by the first player;

receive information that a second player who is associated with the first player has achieved a qualifying event;

determine, in response to the second player achieving the qualifying event, that a bonus is to be provided to the first player, the bonus being funded from the bonus funding account of the first player;

generate an online gaming interface for the first player, the online gaming interface comprising a representation of the first game and a button enabling the first player to accept the bonus;

dynamically generate a bonus feature for the first player by:

(a) selecting, from a plurality of available mathematical models, a first mathematical model to be applied by the program in determining a first value defining a bonus award to be provided to the first player;

(b) receiving a random number output from a random number generator;

(c) applying the random number to the first mathematical model to determine a result;

(d) determining the first value based on the result;

(e) outputting the dynamically generated bonus feature to the first player as a mechanism for providing the first value as the bonus award; and (f) receiving, from the online gaming interface, a signal that the player has actuated the button and therefore accepted the bonus; and decrease, in real-time upon determining that the first player has actuated the button and accepted the bonus, the balance of the bonus funding account by a second value that is different from the first value, the second value being based on a rate of return (RTP) associated with the first mathematical model.

22. A method for facilitating a provision of a bonus to a player of an online game, the method comprising:

maintain a bonus funding account for a first player of a first game at least by increasing in real-time based on game activity of the first player a balance of the bonus funding account of the first player, wherein the bonus funding account is specific to the first game and is for funding bonuses for the first player at a discretion of a gaming establishment and is not controllable by the first player;

receive, by a processor of the computing device, information that a second player who is associated with the first player has achieved a qualifying event;

determine, by the processor and in response to the second player achieving the qualifying event, that a bonus is to be provided to the first player, the bonus being funded from the bonus funding account of the first player;

generate an online gaming interface for the first player, the online gaming interface comprising a representation of the first game and a button enabling the first player to accept the bonus;

dynamically generate a bonus feature for the first player by:

(a) selecting, from a plurality of available mathematical models, a first mathematical model to be applied by the program in determining a first value defining a bonus award to be provided to the first player;

(b) receiving a random number output from a random number generator;

(c) applying the random number to the first mathematical model to determine a result;

(d) determining the first value based on the result;

(e) outputting the dynamically generated bonus feature to the first player as a mechanism for providing the first value as the bonus award; and (f) receiving, from the online gaming interface, a signal that the player has actuated the button and therefore accepted the bonus; and decrease, in real-time upon determining that the first player has actuated the button and accepted the bonus, the balance of the bonus funding account by a second value that is different from the first value, the second value being based on a rate of return (RTP) associated with the first mathematical model.

* * * * *